(12) United States Patent
Bergqvist et al.

(10) Patent No.: US 9,255,818 B2
(45) Date of Patent: Feb. 9, 2016

(54) ARRANGEMENT COMPRISING AN INDUCTIVE PROXIMITY SENSOR, AND METHOD IMPLEMENTING SUCH A SENSOR

(75) Inventors: Johan Bergqvist, Bole (CH); Sietse Wouters, Cormondreche (CH)

(73) Assignee: Posic SA (CH)

( * ) Notice: Subject to any disclaimer, the term of this patent is extended or adjusted under 35 U.S.C. 154(b) by 256 days.

(21) Appl. No.: 13/495,636

(22) Filed: Jun. 13, 2012

(65) Prior Publication Data

US 2012/0303305 A1 Nov. 29, 2012

Related U.S. Application Data

(63) Continuation of application No. PCT/EP2010/069242, filed on Dec. 9, 2010.

(30) Foreign Application Priority Data

Dec. 15, 2009 (CH) ........................................ 1922/09

(51) Int. Cl.
G01D 5/22 (2006.01)
(52) U.S. Cl.
CPC .............. G01D 5/2208 (2013.01); G01D 5/225 (2013.01)
(58) Field of Classification Search
CPC .............................. G01D 5/225; G01D 5/2208
USPC .................. 702/38, 65; 324/647, 207.12, 234
See application file for complete search history.

(56) References Cited

U.S. PATENT DOCUMENTS

| 4,913,152 | A | * | 4/1990 | Ko et al. .................. 600/409 |
| 5,402,096 | A | * | 3/1995 | Harris ....................... 336/130 |
| 6,043,644 | A | * | 3/2000 | de Coulon et al. ....... 324/207.18 |
| 6,175,232 | B1 | * | 1/2001 | De Coulon et al. ....... 324/207.12 |
| 2001/0025424 | A1 | * | 10/2001 | Kogiso et al. ................. 33/1 PT |
| 2009/0021248 | A1 | | 1/2009 | Bernard et al. |
| 2011/0037460 | A1 | * | 2/2011 | Bosnar ........................ 324/239 |
| 2012/0075224 | A1 | * | 3/2012 | Chang et al. ................ 345/173 |

FOREIGN PATENT DOCUMENTS

| DE | 102004057206 A1 | 6/2005 |
| EP | 0805339 A1 | 11/1997 |
| EP | 0871012 A1 | 10/1998 |

* cited by examiner

Primary Examiner — Alexander Satanovsky
(74) Attorney, Agent, or Firm — Blank Rome LLP

(57) ABSTRACT

An electronic circuit detecting proximity includes an excitation coil emitting an inductive excitation field toward a target. A first pair of detection coils obtains a first differential inductive signal that is modified by a transition of the target within the inductive field. An out-of phase second pair of detection coils obtains a second differential inductive signal that is modified by a transition of the target within the inductive field. A comparator generates a transition signal when the difference between the first and second differential signals reaches a threshold value. A stationary target, in a ferromagnetic or conductive material, creates an offset to the signals at the outlet of the coil pairs. The offset is decreased during the presence of a movable target within the same type of material or increased during the presence of a movable target within another type of material. A comparator detects the offset level.

13 Claims, 6 Drawing Sheets

ARRANGEMENT COMPRISING AN INDUCTIVE PROXIMITY SENSOR, AND METHOD IMPLEMENTING SUCH A SENSOR

RELATED APPLICATIONS

This application is a continuation of PCT/EP2010/069242, filed Dec. 9, 2010, which claims priority to 2009CH-01922, filed Dec. 15, 2009, the entire contents of which are hereby incorporated by reference.

TECHNICAL FIELD

The present invention concerns proximity sensors, in particular inductive type proximity sensors.

STATE OF THE ART

Position sensors for measuring the position of an object or of a target in a horizontal and/or vertical (orthogonal) plane are known in the prior art. One variant of position sensors is constituted by proximity sensors, where the aim is more simply, but often in more difficult conditions, to detect the presence or the absence of a target in front of the sensor.

Proximity sensors often use inductive measuring and typically comprise one or several excitation coils generating an inductive field and one or several detection coils generating a current depending on the received inductive field. When a metallic object, called a target, is moved close to the sensor, the magnetic coupling between the excitation coil and the detection coil or coils is modified, which generates a variation of induced tension in the detection coils. This variation enables the presence of a target or of any other discontinuity in an object that affects the electromagnetic coupling between the coils to be detected.

FIG. 1 illustrates diagrammatically one application of such a sensor 1 used for detecting the proximity of targets 20. In this example, the targets are constituted by the successive teeth 20 of a piece 2 rotating in front of the sensor; the inductive sensor 1 generates a signal that is modified at each discontinuity of the piece 2, i.e. at each rising flank 21 or falling flank 22 of the teeth 20. The inductive sensor 1 can be made from excitation and detection coils made in a same plane on a same silicon substrate; this substrate can be encapsulated into an integrated circuit and then mounted onto a printed circuit.

EP805339 describes a position and movement detection device comprising an excitation coil and two secondary coils on the same integrated circuit. The magnetic field received by a secondary winding is modified by the presence of a piece (target) of low or strong permeability in front of this winding. This device enables the position or the speed of a structured mobile piece moving in front of the device to be detected.

US2009021248 describes another inductive proximity detector comprising an excitation coil and a detection coil receiving a magnetic field altered by the presence of a ferromagnetic piece close to these two coils.

EP871012 describes a micro-machined inductive sensor enabling the position or the movement of an object to be detected. In one embodiment, the sensor comprises an emitter coil and two differential pairs of receptor coils detecting a magnetic field altered by the presence of a discontinuity in the object in front of the sensor.

Conventional proximity sensors enable the passing of a target or a discontinuity of the target to be detected in a reliable manner. However, the exact instant of this discontinuity is often difficult to determine accurately. Indeed, the inductive coupling increases progressively as the target covers the detection coil, and it is difficult to set a threshold from which a signal indicating this discontinuity must be generated. Furthermore, the amplitude of the induced signals depends strongly on the distance between the target and the sensor, which is difficult to guarantee with any accuracy; the variation in amplitude causes an undesirable displacement of the instant when the inductive signal reaches a predetermined threshold.

On the other hand, many proximity sensors are based on pairs of differential coils that detect only the discontinuities of the target. However, the absence of target and the presence of a large-size target covering both coils of each pair generate identical output signals, so that these two states cannot be distinguished.

BRIEF SUMMARY OF THE INVENTION

It is one aim of the present invention to propose an arrangement comprising a proximity sensor and a method implementing a proximity sensor that are free from the limitations of the known methods and circuits.

In particular, it is one aim of the invention to propose a method for determining accurately the instant of a discontinuity in a target by means of an inductive proximity sensor.

Another aim is to propose an arrangement and a method for distinguishing between the presence of a target and the absence of a target.

According to the invention, these aims are achieved notably by means of a method implementing an inductive type proximity sensor for detecting a transition in of a movable target in front of said sensor, including the following steps:

generating by means of an excitation coil a magnetic signal directed towards said target;

obtaining a first differential inductive signal with a first pair of detection coils, and of a second differential inductive signal with a second pair of detection coils that are phase-shifted relative to said first pair, wherein said differential inductive signals depend on the voltages induced in said detection coils, wherein said induced voltages depend on the position of said target;

detecting one said transition at the instant when the difference between said first differential inductive signal and said second differential inductive signal reaches a predetermined threshold value.

The inductive sensor implemented in this method thus comprises two pairs of inductive detection coils generating signals that are phase-shifted one relative to the other. The invention is based notably on the observation that the difference between the differential output signals s0, s1 supplied by two phase-shifted differential pairs is less sensitive to variations in amplitude of the excitation signal and to variations in the distance between the sensor and the target. In particular, the position of the points of equality between the two signals is largely unaffected by these variations.

In a preferred embodiment, a transition is detected only when both signals s0 and s1 are equal to one another and when they are both different from zero, in order to avoid detecting a transition in the trivial case where the two signals s0 and s1 are both equal to zero.

In another embodiment, the transition detection is limited to within a window within which at least one of the two signals s0 or s1 is greater than a predetermined threshold $V_{Thresh}$. In another embodiment, this detection is limited to within a window within which the signals s0 and s1 are both greater than a predetermined threshold $V_{Thresh}$. In all cases, this makes it possible to strengthen the reliability of the transition detection by checking that the two signals s0 and s1 are equal only within a relatively narrow window and thus to avoid false detections in case of accidental equality outside of these windows.

According to another aspect, the inventive arrangement includes a stationary target placed in front of at least one of the detection coils in order to introduce in at least one of the inductive signals at the outlet of the differential pairs an offset that enables a distinction between the presence and the absence of target to be made.

This stationary target modifies in a permanent manner the coupling between the excitation coil and the detection coil or coils covered by the stationary target, and thus enables an imbalance to be created between at least one of the pairs of detection coils, even in the absence of a movable target.

The stationary target, as well as the movable target, can be made either of ferromagnetic material (Fe, FeNi etc.) or of a non-ferromagnetic yet conductive material (Cu, Al, brass etc.). Ferromagnetic materials obviously also exhibit a certain electric conductivity which is however normally negligible. For example, the movable target can be constituted by a tooth of a toothed wheel, often of ferromagnetic material, or by a conductor track (for example of copper) on a PCB printed circuit. A fixed or movable target of ferromagnetic material will increase the coupling between primary and secondary coils; conversely, a target of conductive material will decrease this coupling. Without target, there is usually also a coupling, which will be modified in a permanent manner by the presence of a stationary target or in a temporary manner when a movable target passes in front of it.

The stationary target is arranged so as to modify permanently the coupling between the emission coil and one of the detection coils of each pair of differential coils. As only one of the two coils of each pair is affected, the signal at the outlet of the differential coil pair is thus affected by an offset, even in the absence of movable target. When a movable target completely covers both coils of a pair, the coupling with the two coils is increased (in the case of a target made of a ferromagnetic material) or decreased (in the case of a target of conductive material), generating a signal at the outlet of the pair that can be distinguished from the signal existing when a movable target is absent. This configuration thus makes it possible to distinguish between the absence of target and the presence of a long target, generating different induced signals.

BRIEF DESCRIPTION OF THE FIGURES

Examples of implementation of the invention are indicated in the description illustrated by the attached figures, in which.

EXAMPLES OF EMBODIMENTS OF THE INVENTION

Figure 1:
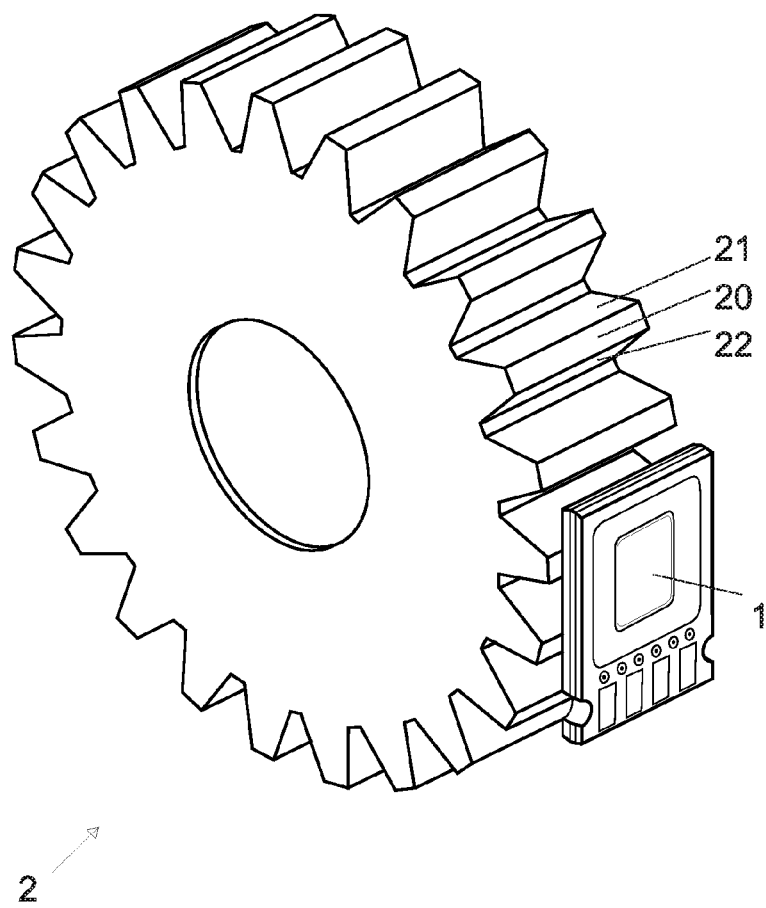
FIG. 1, already described, illustrates an example of application of an arrangement comprising a proximity sensor according to the invention.
Figure 2:
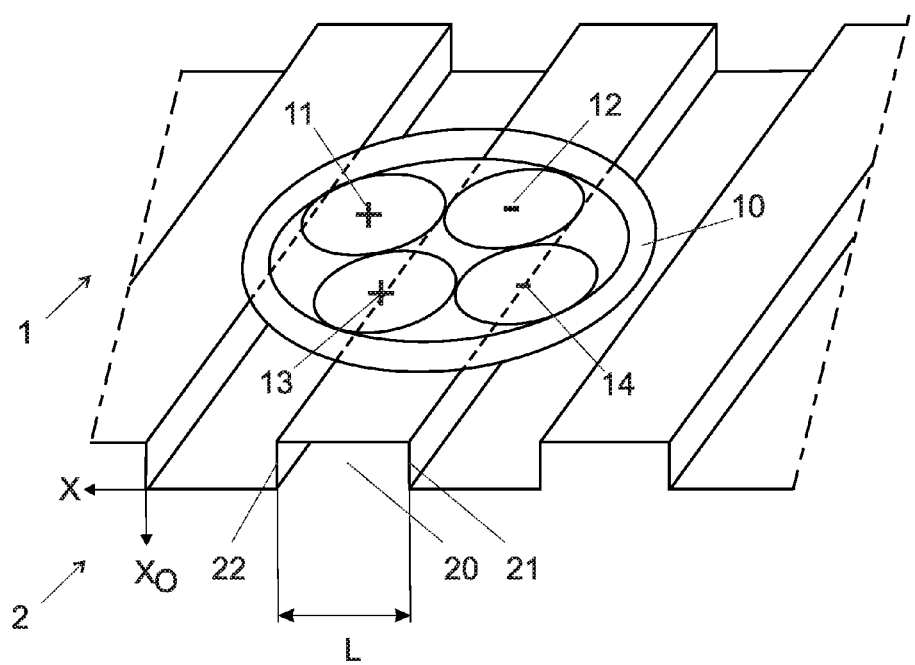
FIG. 2 illustrates a particular example of proximity detection circuits comprising an excitation coil and four phase-shifted detection coils, arranged in two differential pairs.

FIG. 2 illustrates an arrangement of coils in an inductive proximity sensor 1 according to one embodiment of the invention. In this example, the sensor includes a single excitation coil 10 having a large diameter and four detection coils 11, 12, 13, 14 arranged in two differential pairs 11-12 and 13-14. The two serially connected coils in each differential pair have opposite phases, which makes it possible to supply at the outlet of each pair 11-12 respectively 13-14 a differential signal in which the common mode is eliminated and which is thus less sensitive to disturbances due to variations in amplitude of the excitation signal or to variations in the distance to the piece 2. In the figure, the two "positive" coils 11, 13 marked with a plus sign are connected so that the induced signal at the outlet of the pair increases when the coupling with the excitation coil 10 whilst the two "negative" coils 12, 14 are connected in the other direction so as to cause a decrease of this induced signal when the coupling increases.

The excitation signal is typically a high-frequency (HF) signal of approximately 1 MHz and generates an induced voltage in the detection coils. The intensity of the induced voltage depends on the electromagnetic coupling between the excitation coil and the detection coils and is thus modified by the presence of a target close to the sensor.

The coils 10 to 14 as well as the interface and signal processing electronic circuit are advantageously integrated onto a semiconductor substrate, for example of silicon, with the whole unit typically occupying a surface less than 10 mm$^2$. An analog and digital signal processing electronic circuit can be made on the same substrate. The thus formed integrated circuit can then be encapsulated and subsequently mounted onto a rigid or flexible printed circuit, for example using chip-on-board or flip-chip type technology. The invention can however also be applied to discrete coils mounted for example onto a printed circuit and connected to an electronic circuit on the same printed circuit or elsewhere. In another variant embodiment, the coils are made from tracks printed onto a monolayer or multilayer printed circuit, onto which the electronic circuit can also be mounted.

In this example, the piece 2 that moves linearly above the sensor 1 comprises a periodic succession of teeth (targets) 20. The pitch L of the teeth 20 of the piece 2 correspond in this example to the diameter of the detection coils 11 to 14. It is however also possible to use different spaces between two metallic teeth of the target, for example ferromagnetic teeth whose width corresponds to one third of the period, or targets constituted of copper tracks whose width corresponds for example to two thirds or more of the period.

In the illustrated configuration, the signals at the outlet of both pairs of differential coils 11-12 and 13-14 are approximately sinusoidal and phase-shifted by 90° one relative to the other, with a period equal to the time during which the piece travels by the length 2L along the axis x.

This proximity sensor can also be used for detecting rotation movements. Another possible application of this type of sensor concerns the detection of spaced targets or even of unique objects. One example is the detection of teeth on a wheel comprising a single tooth, or a limited number of spaced teeth or even the detection of moving parts in a machine or a vehicle. The diameter of the coils is thus not necessarily limited to the dimensions of the target or targets.

Figure 3A:
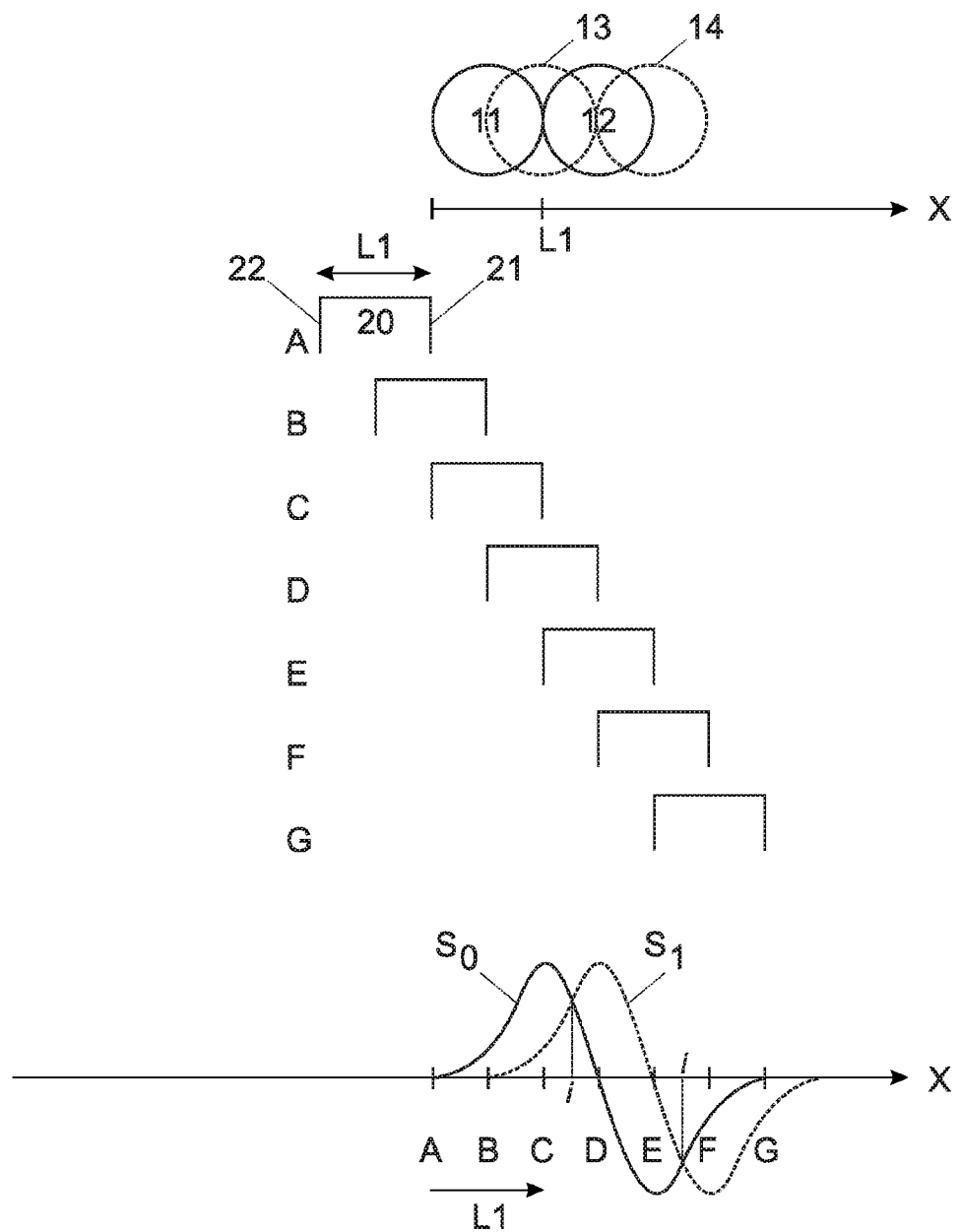
FIG. 3a illustrates the signals s0, s1 at the outlet of both differential pairs when a small-width target is moved in front of the sensor.

FIG. 3a illustrates the output signals s0 respectively s1 generated by the first differential pair 11-12 respectively by the second differential pair 13-14 when an isolated target, for example a tooth, is displaced in front of the sensor 1 of FIG. 2. In this example, the width L1 of the tooth 20 corresponds to the diameter of the detection coils 11 to 14, whose longitudinal position along the axis x is illustrated diagrammatically at the top of the figure. The lines A to G illustrate 6 successive longitudinal positions of the tooth 20 in front of the two pairs of coils.

At the instant A, the front flank 21 of the ferromagnetic target 20 arrives in front of the detection coil 11; the coupling with the excitation coil 10 then increases progressively until the instant C when the tooth 20 is perfectly centered in front of this coil, so that the voltage s0 increases. After C, the front part of the target 20 progressively leaves the coil 11 to cover the opposite coil 12, so that the differential signal s0 decreases very rapidly until the instant D when the tooth straddles, and is centered in front of, the two coils mounted opposite to one another 11 and 12; the difference signal s0 is then zero.

After D, the target 20 continues to move towards the detection coil 13, until the instant E when the coupling with this coil is at its maximum; the signal s0 is then minimal. The target then continues to move along the axis x, so that the coupling with 12 decreases until the instant G where the rear flank of the tooth leaves the coil 12; s0 is then again zero.

The signal s1 at the outlet of the second differential pair is identical to s0 but phase-shifted by 90° ($L_1/2$).

Figure 3B:
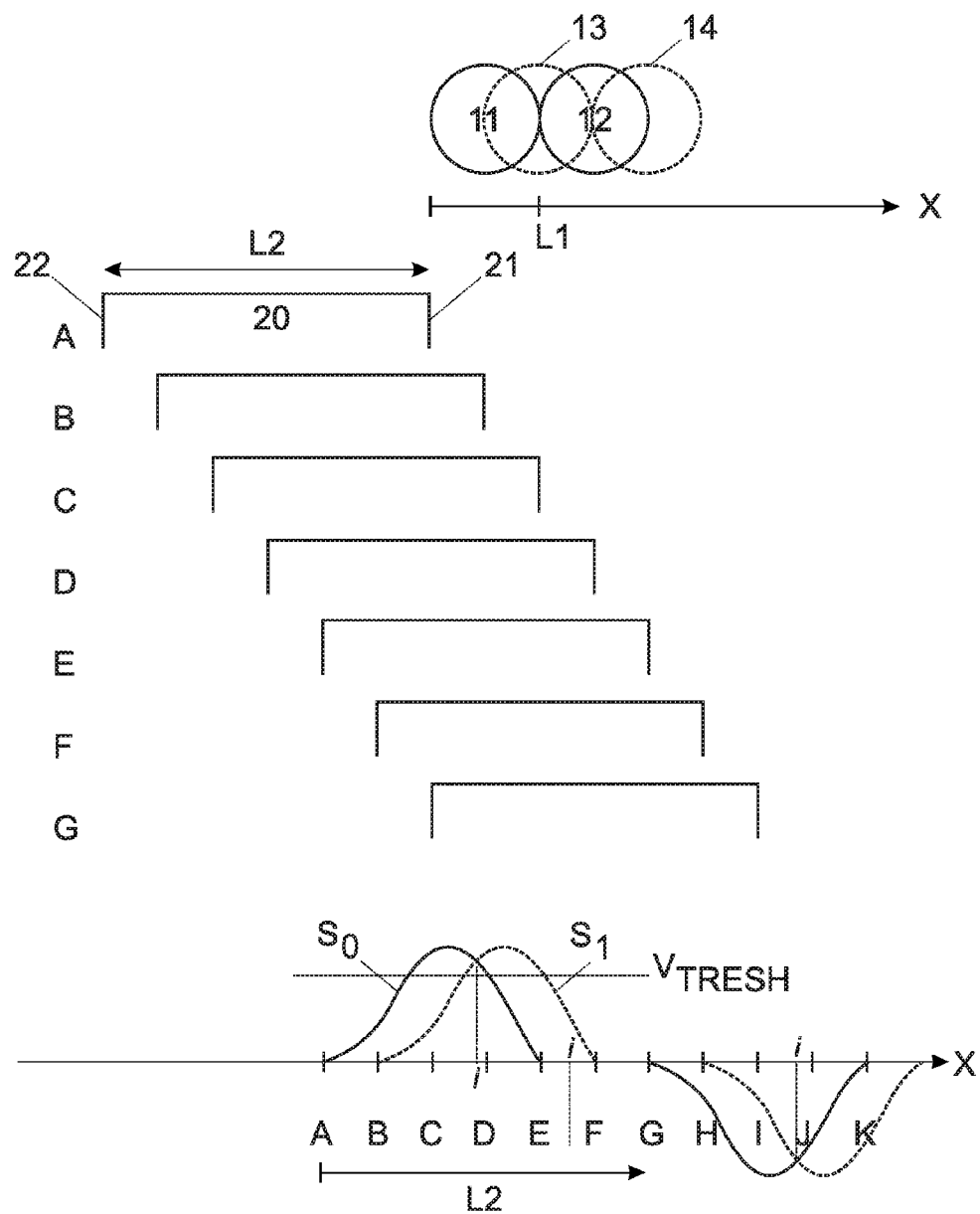
FIG. 3b illustrates the signals s0, s1 at the outlet of both differential pairs when a large-size target is moved in front of the sensor.

FIG. 3B illustrates a situation wherein the width L2 of the moving ferromagnetic target 20 is much greater than the diameter L1 of the coils 11 to 14. Between the instants A and C, the situation is identical to the one commented further above in relation to FIG. 3A. After C (arrival of the target), the front flank 21 reaches the second coil 12, so that the signal s0 decreases. The rear 22 of the target 22 however does not yet reach the coil 11 and the decrease is thus slower than in the example of FIG. 3A; it continues until the instant E, from when onwards the two coils 11 and 12 of the first pair are entirely covered by the target 20.

The signal at the outlet of the differential pair 10-11 is then zero until the instant G (departure of the target), when the rear flank 22 reaches the first coil 11. The signal s0 between the instants G and K then evolves in opposite manner to the instants A to E, as the tooth 20 continues to free the two coils 11 and 12. The FIG. 3B also illustrates the signal s1 at the outlet of the second differential pair 13-14, which corresponds to the signal s0 phase-shifted by 90°.

A first problem of conventional sensors and of the sensor described so far relates to the accuracy in detecting the lateral position of the target. As is visible in FIGS. 3A and 3B, the signals s0 and s1 go away from zero at a very shallow gradient, which is not favorable for setting a comparator threshold and detecting in an accurate and reliable manner the transitions of the target (flanks 21 and 22) and the instant at which the target arrives or departs. Furthermore, the necessary threshold level depends on the amplitude of the detection signal and the distance between the sensor and the target, which can very according to the applications and according to the type of target.

One observes, in an unexpected fashion, that the difference between the two differential output signals s0, s1 supplied by both pairs is largely unaffected by variations in the amplitude of the excitation signal and by variations in the distance between the sensor and the target. In particular, the temporal position of the intersection point i between the two signals s0 and s1 is not very sensitive to these variations; it corresponds to a phase of 45° in the positive case, respectively of 225° in the negative case.

The detection circuit thus advantageously includes means of a comparator type for computing the difference between the signals s0 and s1 and for generating a signal indicating a transition at the instant i when this difference is zero or when it reaches a predetermined threshold. The measurement is thus of a double differential type and performs a difference between the output signal of two differential pairs.

Advantageously, a transition is detected only when the two signals s0 and s1 are both different from zero (or greater than a threshold $V_{Thresh}$) and equal to one another, in order to avoid detecting a transition in the trivial case where the two signals s0 and s1 are both equal to zero. A comparator can thus be used to compare each of the two signals s0, s1 with a threshold value and determine whether they are equal to zero or not. In another variant embodiment, a transition is detected when s0 and s1 are equal only if at least one of the two signals s0 and s1 is greater to a threshold $V_{Thresh}$.

The sign of one of the differential inductive signals s0, s1 or of both signals can also be determined in order to distinguish between rising transitions 21 (arrival of a new movable target 2 or increase of the coupling in the case of a ferromagnetic target) and falling transitions 22 (decrease of the coupling when the ferromagnetic target moves away). In the case of a movable target of conductive material, the coupling decreases when a new movable target arrives and increases again when this target departs.

The means for detecting the difference between the two signals s0 and s1 can include an analog and digital electronic circuit. In one embodiment, this difference is computed in real time by a computer program executed by a microcontroller in the same integrated circuit as the detection coils 11-14 or by an external microprocessor or microcontroller.

Another problem with the sensor of FIG. 2 relates to the difficulty in detecting the presence of a target. As can be seen in particular in FIG. 3B, the output signals s0 and s1 are only modified during a transition or discontinuity of the target 2, for example during rising flanks 21 and falling flanks 22. The value of these two signals is however equal to zero both in the absence of target (before the instant A) and when the target covers simultaneously all the coils of each differential pair (between the instants E and G9. It is thus not possible to distinguish between the absence of tooth and the presence of a "long" tooth, notably when the sensor is started.

Figure 4:
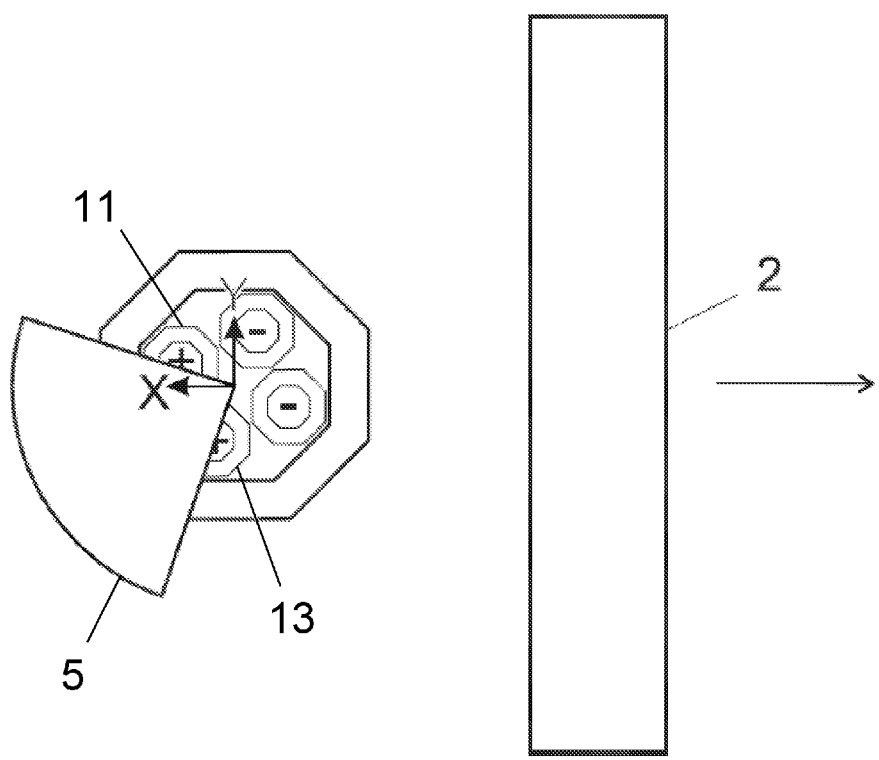
FIG. 4 is a top view of an arrangement comprising an inductive proximity sensor, a stationary target and a movable target.

In order to solve this problem, the inventive circuit advantageously includes a stationary target whose position is determined in a fixed manner relative to the detection coils. An example of stationary target 5 is illustrated in FIG. 4. In this embodiment, the stationary target covers partly and permanently one of the detection coils 11 respectively 13 of each differential pair, so as to modify the magnetic coupling between these coils 11, 13 and the excitation coil 10.

Figure 5:
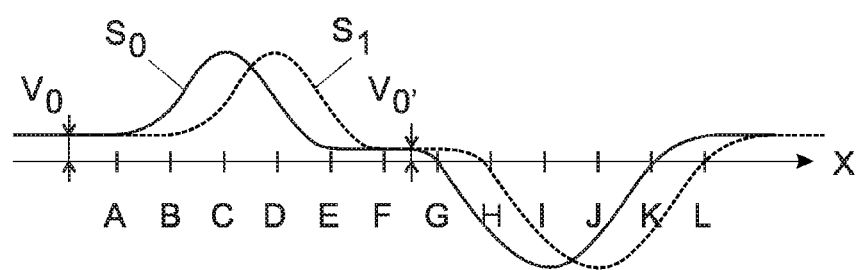
FIG. 5 illustrates the signals s0, s1 at the outlet of both differential pairs when a large-size target is moved in front of the arrangement of FIG. 4, wherein the stationary target is made of a ferromagnetic material.

Because of this coupling, the voltages induced by the two coils of each pair no longer compensate each other perfectly, so that the signals s0 and s1 are not equal to zero even in the absence of a movable target 2 in the vicinity. The stationary target 5 thus artificially creates an offset voltage $V_0$ in the absence of any movable target 2. FIG. 5 illustrates this offset voltage in conditions equivalent to those of FIG. 3B, i.e. when a large-size target passes in front of the sensor of FIG. 4.

In a first case illustrated in FIG. 5, the stationary target 5 is made of a ferromagnetic material, for example of steel, and thus increases the coupling of the excitation coil 10 with the two relevant detection coils 11, 13—notably before the instant A. The stationary target thus creates a positive offset $V_0$ in this example.

The movable target 2 is also made of a ferromagnetic material in this example and moves in front of the sensor until it completely covers the four detection coils 11 to 14 (instants E to G). Between the instant A and the instant E, the voltage s0, s1 at the outlet of each pair increases progressively as the ferromagnetic target progresses by covering the "positive" coils of each pair, then decreases again as soon as the movable target reaches the place in front of the "negative" coils of each pair.

Between the instants E and G, the movable target 2 completely covers the four detection coils, so that the voltages induced in the two coils of each differential pair compensate each other at least partially. The offset $V_0'$ is thus reduced and the voltages s0 and then s1 get closer to zero.

The signals s0 and s1 thus make it possible to distinguish between the absence of movable target (period before the instant A, characterized by an offset $V_0$) and the presence of a movable target covering all the coils (period from F to G, with a reduced offset $V_0'$).

In one embodiment, the movable target 2 is always made of a ferromagnetic material, but the stationary target 5 is constituted of a non-ferromagnetic electrically conductive material, for example of copper, aluminum, brass etc.; the Foucault currents generated by this stationary target 5 have the effect of decreasing the coupling between the excitation coil 10 and the coils 11, 13 partly covered by this stationary target. A conducting stationary target can advantageously be made by a conductor track on the printed circuit onto which the coils are mounted or printed.

In another variant embodiment, the two stationary and movable targets are both made of conductive material, which has the effect of decreasing the coupling between coils.

Finally, it is also possible in one variant embodiment to use a movable target 2 made of a conductive material and a stationary target 5 made of a ferromagnetic material.

It is also possible to use a stationary target 5 that covers a single detection coil and thus affects only one of the two differential pairs; this variant has the advantage of not reducing the dynamic range of the other differential pair.

Furthermore, it will be observed that using a stationary target 5 to create an offset does not affect the possibility of detecting with precision the instant i of a transition of the target; the difference between the two differential output signals s0, s1 is zero at a precise and reproducible instant even if a stationary target is present.

It is however advantageous to use a stationary target 5 that covers only partly the different relevant detection coils, whose induced voltage thus remains affected by the stationary target. This makes it possible to perform an accurate detection of the lateral position of the target with the method described further above and to maintain a sufficient dynamic range of measurement.

The stationary target 5 can advantageously be made by means of a layer of ferromagnetic or non ferromagnetic material deposited for example onto the printed circuit onto which the sensor is mounted. The stationary target is for example advantageously achieved by a metallic layer on a track or layer of said printed circuit that is not the same as the track or layer onto which the integrated circuit is mounted. This variant enables a stationary target to be made without modifying the integrated circuit.

Alternatively, it is also possible to make a stationary target 5 inside the integrated circuit containing the detection coils 11-14 or elsewhere.

Other means can be implemented to create an imbalance of one or several pairs of differential coils and create a different offset in the absence of any tooth or in the presence of a tooth covering simultaneously all the coils of a differential pair. For example, it is possible to make pairs of differential coils constituted of two different coils, for example coils of different sizes or with different numbers of spires, in order to create an offset.

On the other hand, it is also possible to use the signal at the outlet of a coil or of several serially connected coils (rather than as differential) in order to determine the amplitude of the received signal and thus the distance to the target ad/or the amplitude of the excitation signal.

Furthermore, the invention can also be implemented with sensors or systems comprising any number whatsoever of differential inductive pairs, for example 1, 2 or N pairs.

The invention claimed is:

1. A method for detecting a transition of a movable target in front of a sensor, comprising:
    generating by means of an excitation coil a magnetic signal directed towards said target;
    obtaining a first differential inductive signal with a first pair of detection coils and a second differential inductive signal with a second pair of detection coils,
    wherein said second pair of detection coils is phase-shifted relative to said first pair of detection coils;
    wherein said differential inductive signals depend on the voltages induced in said first and second detection coils;
    wherein said induced voltages depend on the position of said target; and
    wherein a stationary target is placed in a permanent manner in front of at least one of said detection coils creating an offset on said first differential inductive signal and on said second differential inductive signal, said offset being increased or decreased by the presence of the movable target; and
    detecting one said transition at the instant when a difference between said first differential inductive signal and said second differential inductive signal reaches at least one of zero and a predetermined threshold value,
    wherein the difference between said first differential inductive signal and said second differential inductive signal is obtained by means of a comparator on said semiconductor substrate;
    wherein said excitation coil, said first pair of detection coils, said second pair of detection coils and said comparator are made on a same semiconductor substrate, and
    wherein said transition is detected by said comparator at an instant when said difference reaches at least one of zero and said predetermined threshold value.

2. The method of claim 1, wherein the sign of at least one of said differential inductive signals is used to distinguish between the arrival of a target in front of said detection coils and the departure of a target moving away from these detection coils.

3. The method of claim 1, wherein a transition is detected when said first and second differential inductive signals are different from zero and equal to one another.

4. The method of claim 1, wherein a transition is detected when said first differential inductive signal and said second differential inductive signal are greater than a threshold.

5. The method of claim 1, wherein the difference between said first differential inductive signal and said second differential inductive signal is obtained by means of a computer software executed by a microcontroller on said semiconductor substrate.

6. The method of claim 1, wherein at least one of said differential inductive signals is compared to a threshold value in order to distinguish between the presence and the absence of a movable target.

7. Arrangement, comprising:
   an excitation coil for emitting an inductive excitation field directed towards a movable target;
   a first pair of detection coils mounted in a differential fashion and arranged for generating a first differential inductive signal depending on said target;
   a second pair of detection coils mounted in a differential fashion and arranged for generating a second differential inductive signal depending on said target;
   a comparator for obtaining the difference between said first differential inductive signal and said second differential inductive signal and for generating a transition signal at an instant when said difference reaches at least one of zero and a threshold value,
   wherein said excitation coil, said first pair of detection coils, said second pair of detection coils and said comparator are made on a same semiconductor substrate, and
   wherein a stationary target is placed in a permanent manner in front of at least one of said detection coils creating an offset on said first differential inductive signal and on said second differential inductive signal, said offset being increased or decreased by the presence of the movable target.

8. The arrangement of claim 7, wherein said stationary target is made of a ferromagnetic material so as to increase the coupling between said excitation coil and the detection coil or coils in front of which said movable target is placed.

9. The arrangement of claim 7, wherein said stationary target is made of a non ferromagnetic conductive material so as to decrease the coupling between said excitation coil and the detection coil or coils in front of which said movable target is placed.

10. The arrangement of claim 7, including a printed circuit onto which an integrated circuit including said coils is mounted, said stationary target being constituted of a metallic layer on a track or layer of said printed circuit that is not the same as the track or layer onto which the integrated circuit is mounted.

11. The arrangement of claim 7, wherein said movable target comprising a machine part of a ferromagnetic material.

12. The arrangement of claim 7, wherein said movable target comprising a conductor track on a printed circuit.

13. The arrangement of claim 7,
   wherein said target covers partly one of the detection coils,
   wherein the coupling between said partly covered detection coil or coils and the excitation coil is modified by the presence of a movable target.

* * * * *